US007387675B2

(12) United States Patent
Roddy et al.

(10) Patent No.: US 7,387,675 B2
(45) Date of Patent: Jun. 17, 2008

(54) FOAMED SETTABLE COMPOSITIONS COMPRISING CEMENT KILN DUST

(75) Inventors: Craig W. Roddy, Duncan, OK (US); Jiten Chatterji, Duncan, OK (US); D. Chad Brenneis, Marlow, OK (US); Bobby J. King, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 67 days.

(21) Appl. No.: 11/223,703

(22) Filed: Sep. 9, 2005

(65) Prior Publication Data

US 2007/0056474 A1 Mar. 15, 2007

(51) Int. Cl.
C04B 18/08 (2006.01)
(52) U.S. Cl. .................................. 106/716
(58) Field of Classification Search ............ 106/716
See application file for complete search history.

(56) References Cited

U.S. PATENT DOCUMENTS

| 2,094,316 | A |   | 9/1937  | Cross et al.     |         |
|-----------|---|---|---------|------------------|---------|
| 2,329,940 | A |   | 9/1943  | Ponzer           |         |
| 2,842,205 | A |   | 7/1958  | Allen et al.     |         |
| 2,848,051 | A |   | 8/1958  | Williams         |         |
| 2,871,133 | A |   | 1/1959  | Palonen et al.   |         |
| 2,945,769 | A |   | 7/1960  | Gama et al.      |         |
| 3,168,139 | A |   | 2/1965  | Kennedy          |         |
| 3,454,095 | A |   | 7/1969  | Messenger et al. |         |
| 3,499,491 | A |   | 3/1970  | Wyant            |         |
| 3,557,876 | A |   | 1/1971  | Tragesser        |         |
| 3,748,159 | A |   | 7/1973  | George           |         |
| 3,876,005 | A |   | 4/1975  | Fincher          |         |
| 3,887,009 | A |   | 6/1975  | Miller           |         |
| 3,887,385 | A |   | 6/1975  | Quist et al.     |         |
| 4,018,617 | A |   | 4/1977  | Nicholson        |         |
| 4,031,184 | A |   | 6/1977  | McCord           |         |
| 4,176,720 | A |   | 12/1979 | Wilson           |         |
| 4,268,316 | A |   | 5/1981  | Wills, Jr.       |         |
| 4,341,562 | A |   | 7/1982  | Ahlbeck          |         |
| RE31,190  | E |   | 3/1983  | Detroit et al.   |         |
| 4,407,677 | A |   | 10/1983 | Wills, Jr.       |         |
| 4,432,800 | A |   | 2/1984  | Kneller et al.   |         |
| 4,435,216 | A |   | 3/1984  | Diehl et al.     |         |
| 4,460,292 | A |   | 7/1984  | Durham et al.    |         |
| 4,494,990 | A | * | 1/1985  | Harris           |         |
| 4,515,635 | A |   | 5/1985  | Rao et al.       |         |
| 4,519,452 | A |   | 5/1985  | Tsao             |         |
| 4,555,269 | A |   | 11/1985 | Rao et al.       |         |
| 4,614,599 | A |   | 9/1986  | Walker           |         |
| 4,624,711 | A | * | 11/1986 | Styron           | 106/405 |
| 4,676,317 | A |   | 6/1987  | Fry et al.       |         |
| 4,741,782 | A |   | 5/1988  | Styron           |         |
| 4,784,223 | A |   | 11/1988 | Worrall et al.   |         |
| 4,883,125 | A |   | 11/1989 | Wilson           |         |
| 4,941,536 | A |   | 7/1990  | Brothers et al.  |         |
| 4,992,102 | A |   | 2/1991  | Barbour et al.   |         |
| 5,030,366 | A |   | 7/1991  | Wilson et al.    | 507/228 |
| 5,049,288 | A |   | 9/1991  | Brothers et al.  |         |
| 5,058,679 | A |   | 10/1991 | Hale             |         |
| RE33,747  | E |   | 11/1991 | Hartley et al.   |         |
| 5,086,850 | A |   | 2/1992  | Harris et al.    |         |
| 5,121,795 | A |   | 6/1992  | Ewert et al.     |         |
| 5,123,487 | A |   | 6/1992  | Harris et al.    |         |
| 5,125,455 | A |   | 6/1992  | Harris et al.    |         |
| 5,127,473 | A |   | 7/1992  | Harris et al.    |         |
| 5,183,505 | A | * | 2/1993  | Spinney          |         |
| 5,213,160 | A |   | 5/1993  | Nahm             |         |
| 5,238,064 | A |   | 8/1993  | Dahl et al.      |         |
| 5,266,111 | A |   | 11/1993 | Barbour et al.   |         |
| 5,295,543 | A |   | 3/1994  | Terry et al.     |         |
| 5,305,831 | A |   | 4/1994  | Nahm             |         |
| 5,314,022 | A |   | 5/1994  | Cowan et al.     |         |
| 5,327,968 | A |   | 7/1994  | Onan et al.      |         |
| 5,337,824 | A |   | 8/1994  | Cowan            |         |
| 5,352,288 | A |   | 10/1994 | Mallow           |         |
| 5,358,044 | A |   | 10/1994 | Hale et al.      |         |
| 5,358,049 | A |   | 10/1994 | Hale             |         |

(Continued)

FOREIGN PATENT DOCUMENTS

CA          2153372          9/1996

(Continued)

OTHER PUBLICATIONS

Paper entitled "Standards for the Management of Cement Kiln Dust Waste" printed from the internet Apr. 14, 2005.
Sersale, R. et al., "Portland-Zeolite-Cement for Minimizing Alkali-Aggregate Expansion" dated 1987.
Marfil,S.A. et al., "Zeolite Crystallization in Portland Cement Concrete Due to Alkali-Aggregate Reaction" dated 1993.

(Continued)

*Primary Examiner*—Paul Marcantoni
(74) *Attorney, Agent, or Firm*—Craig W. Roddy; Baker Botts, LLP.

(57) ABSTRACT

The present invention provides settable compositions that comprise water and cement kiln dust. The settable compositions optionally may comprise an additive that comprises at least one of the following group: fly ash; shale; slag cement; zeolite; metakaolin; and combinations thereof. The settable compositions optionally may be foamed with a gas. Methods of cementing also are provided that comprise: providing the settable composition; introducing the settable composition into a location to be cemented; and allowing the settable composition to set therein. The location to be cemented may be above ground or in a subterranean formation.

28 Claims, No Drawings

U.S. PATENT DOCUMENTS

| | | |
|---|---|---|
| 5,361,841 A | 11/1994 | Hale |
| 5,361,842 A | 11/1994 | Hale |
| 5,368,103 A | 11/1994 | Heathman et al. |
| 5,370,185 A | 12/1994 | Cowan |
| 5,372,641 A | 12/1994 | Carpenter |
| 5,382,290 A | 1/1995 | Nahm et al. |
| 5,383,521 A | 1/1995 | Onan et al. |
| 5,383,967 A | 1/1995 | Chase |
| 5,398,758 A | 3/1995 | Onan |
| 5,423,379 A | 6/1995 | Hale |
| 5,439,056 A | 8/1995 | Cowan |
| 5,458,195 A | 10/1995 | Totten et al. |
| 5,464,060 A | 11/1995 | Hale |
| 5,472,051 A | 12/1995 | Brothers |
| 5,476,144 A | 12/1995 | Nahm |
| 5,494,513 A | 2/1996 | Fu et al. |
| 5,499,677 A | 3/1996 | Cowan |
| 5,515,921 A | 5/1996 | Cowan |
| 5,518,996 A | 5/1996 | Maroy et al. |
| 5,520,730 A | 5/1996 | Barbour et al. |
| 5,529,624 A | 6/1996 | Riegler |
| 5,536,311 A | 7/1996 | Rodrigues |
| 5,542,782 A | 8/1996 | Carter |
| 5,569,324 A | 10/1996 | Totten et al. |
| 5,580,379 A | 12/1996 | Cowan |
| 5,585,333 A | 12/1996 | Dahl et al. |
| 5,588,489 A | 12/1996 | Chatterji et al. |
| 5,673,753 A | 10/1997 | Hale |
| 5,711,383 A | 1/1998 | Terry et al. |
| 5,716,910 A | 2/1998 | Totten et al. |
| 5,728,654 A | 3/1998 | Dobson, Jr. et al. |
| 5,851,960 A | 12/1998 | Totten |
| 5,866,516 A | 2/1999 | Costin |
| 5,874,387 A | 2/1999 | Carpenter et al. |
| 5,897,699 A | 4/1999 | Chatterji et al. |
| 5,900,053 A | 5/1999 | Brothers et al. |
| 5,913,364 A | 6/1999 | Sweatman |
| 5,988,279 A | 11/1999 | Udarbe |
| 6,022,408 A | 2/2000 | Stokes |
| 6,060,434 A | 5/2000 | Sweatman et al. |
| 6,060,535 A | 5/2000 | Villar et al. |
| 6,063,738 A | 5/2000 | Chatterji et al. |
| 6,138,759 A | 10/2000 | Chatterji et al. |
| 6,143,069 A | 11/2000 | Brothers et al. |
| 6,145,591 A | 11/2000 | Boncan et al. |
| 6,153,562 A | 11/2000 | Villar et al. |
| 6,167,967 B1 | 1/2001 | Sweatman |
| 6,170,575 B1 | 1/2001 | Reddy et al. |
| 6,230,804 B1 | 5/2001 | Mueller et al. |
| 6,244,343 B1 | 6/2001 | Brothers et al. |
| 6,245,142 B1 | 6/2001 | Reddy et al. |
| 6,258,757 B1 | 7/2001 | Sweatman et al. |
| 6,277,189 B1 | 8/2001 | Chugh .................. 106/705 |
| 6,312,515 B1 | 11/2001 | Barlet-Gouedard et al. |
| 6,315,042 B1 | 11/2001 | Griffith et al. |
| 6,332,921 B1 | 12/2001 | Brothers et al. |
| 6,367,550 B1 | 4/2002 | Chatterji et al. |
| 6,379,456 B1 | 4/2002 | Heathman et al. |
| 6,402,833 B1 | 6/2002 | O'Hearn |
| 6,409,819 B1 | 6/2002 | Ko |
| 6,457,524 B1 | 10/2002 | Roddy |
| 6,478,869 B2 | 11/2002 | Reddy et al. |
| 6,488,763 B2 | 12/2002 | Brothers et al. |
| 6,494,951 B1 | 12/2002 | Reddy et al. |
| 6,500,252 B1 * | 12/2002 | Chatterji et al. |
| 6,508,305 B1 | 1/2003 | Brannon et al. |
| 6,524,384 B2 | 2/2003 | Griffith et al. |
| 6,547,871 B2 | 4/2003 | Chatterji |
| 6,561,273 B2 | 5/2003 | Brothers et al. |
| 6,562,122 B2 | 5/2003 | Dao et al. |
| 6,565,647 B1 | 5/2003 | Day et al. |
| 6,572,697 B2 | 6/2003 | Gleeson |
| 6,610,139 B2 | 8/2003 | Reddy et al. |
| 6,626,243 B1 | 9/2003 | Boncan |
| 6,645,290 B1 | 11/2003 | Barbour |
| 6,656,265 B1 | 12/2003 | Garnier et al. |
| 6,660,080 B2 | 12/2003 | Reddy et al. |
| 6,666,268 B2 | 12/2003 | Griffith et al. |
| 6,668,929 B2 | 12/2003 | Griffith et al. |
| 6,689,208 B1 | 2/2004 | Brothers |
| 6,702,044 B2 | 3/2004 | Reddy et al. |
| 6,706,108 B2 | 3/2004 | Polston |
| 6,716,282 B2 | 4/2004 | Griffith et al. |
| 6,729,405 B2 | 5/2004 | DiLullo et al. |
| 6,767,398 B2 | 7/2004 | Trato |
| 6,776,237 B2 | 8/2004 | Dao et al. |
| 6,796,378 B2 | 9/2004 | Reddy et al. |
| 6,797,054 B2 | 9/2004 | Chatterji et al. |
| 6,823,940 B2 | 11/2004 | Reddy et al. |
| 6,835,243 B2 | 12/2004 | Brothers et al. |
| 6,837,316 B2 | 1/2005 | Reddy et al. |
| 6,846,357 B2 | 1/2005 | Reddy et al. |
| 6,848,519 B2 | 2/2005 | Reddy et al. |
| 6,887,833 B2 | 5/2005 | Brothers et al. |
| 6,889,767 B2 | 5/2005 | Reddy et al. |
| 6,904,971 B2 | 6/2005 | Brothers et al. |
| 6,908,508 B2 | 6/2005 | Brothers |
| 6,911,078 B2 | 6/2005 | Barlet-Gouedard et al. |
| 7,048,053 B2 | 5/2006 | Santra |
| 7,077,203 B1 | 7/2006 | Roddy et al. |
| 7,174,962 B1 | 2/2007 | Roddy |
| 7,199,086 B1 | 4/2007 | Roddy |
| 7,204,307 B2 | 4/2007 | Roddy |
| 7,204,310 B1 | 4/2007 | Roddy |
| 7,213,646 B2 | 5/2007 | Roddy |
| 7,284,609 B2 | 10/2007 | Roddy et al. ............... 166/291 |
| 2002/0033121 A1 | 3/2002 | Marko |
| 2002/0073897 A1 | 6/2002 | Trato |
| 2002/0117090 A1 | 8/2002 | Ku |
| 2003/0116065 A1 | 6/2003 | Griffith et al. |
| 2003/0116887 A1 | 6/2003 | Scott |
| 2003/0167970 A1 | 9/2003 | Polston |
| 2004/0007162 A1 | 1/2004 | Morioka et al. |
| 2004/0040475 A1 | 3/2004 | Roij |
| 2004/0079260 A1 | 4/2004 | Datta et al. |
| 2004/0107877 A1 | 6/2004 | Getzlaf et al. |
| 2004/0108113 A1 | 6/2004 | Luke et al. |
| 2004/0112600 A1 | 6/2004 | Luke et al. |
| 2004/0118092 A1 | 6/2004 | Santra et al. |
| 2004/0187740 A1 | 9/2004 | Timmons |
| 2004/0188091 A1 | 9/2004 | Luke et al. |
| 2004/0188092 A1 | 9/2004 | Santra et al. |
| 2004/0191439 A1 | 9/2004 | Bour et al. |
| 2004/0211562 A1 | 10/2004 | Brothers et al. |
| 2004/0211564 A1 | 10/2004 | Brothers et al. |
| 2004/0244650 A1 | 12/2004 | Brothers |
| 2004/0244977 A1 | 12/2004 | Luke et al. |
| 2004/0256102 A1 | 12/2004 | Trato |
| 2005/0000734 A1 | 1/2005 | Getzlaf et al. |
| 2005/0034867 A1 | 2/2005 | Griffith et al. |
| 2005/0056191 A1 | 3/2005 | Brothers et al. |
| 2005/0072599 A1 | 4/2005 | Luke et al. |
| 2005/0084334 A1 | 4/2005 | Shi |
| 2005/0098317 A1 | 5/2005 | Reddy et al. |
| 2005/0133221 A1 | 6/2005 | Chatterji et al. |
| 2006/0025312 A1 | 2/2006 | Santra et al. |
| 2006/0162926 A1 | 7/2006 | Roddy .................. 166/278 |
| 2006/0166834 A1 | 7/2006 | Roddy .................. 507/140 |
| 2006/0260512 A1 | 11/2006 | Nordmeyer |
| 2007/0056475 A1 | 3/2007 | Roddy |
| 2007/0056476 A1 | 3/2007 | Roddy |
| 2007/0056479 A1 | 3/2007 | Gray |
| 2007/0056733 A1 | 3/2007 | Roddy |
| 2007/0056734 A1 | 3/2007 | Roddy |

| | | | |
|---|---|---|---|
| 2007/0089643 | A1 | 4/2007 | Roddy |
| 2007/0089880 | A1 | 4/2007 | Roddy |
| 2007/0102157 | A1 | 5/2007 | Roddy |
| 2007/0238621 | A1 | 10/2007 | Roddy et al. ............... 507/140 |

FOREIGN PATENT DOCUMENTS

| | | |
|---|---|---|
| EP | 1 348 831 | 10/2003 |
| JP | 52117316 A | 1/1977 |
| JP | 10110487 | 4/1998 |
| NL | 1469954 | 4/1977 |
| RU | 1373781 | 2/1988 |
| WO | WO 83/01443 | 4/1983 |
| WO | WO98/54108 | 12/1998 |
| WO | WO 00/63134 | 10/2000 |
| WO | WO 03/031364 | 4/2003 |
| WO | WO 03/031364 A1 | 4/2003 |

OTHER PUBLICATIONS

Janotka, I., "The Properties of Mortar Using Blends With Portland Cement Clinker, Zeolite Tuff and Gypsum" dated 1995.
Atkins, M. et al., "Zeolite P In Cements" Its Potential For Immobilizing Toxic and Radioactive Waste Species dated 1995.
Rogers, B.A. et al., "Designing a Remedial Acid Treatment for Gulf of Mexico Deepwater Turbidite Sands Containing Zeolite Cement" dated 1998.
Janotka, I. et al., "Effect of Bentonite and Zeolite on Durability of Cement Suspension under Sulfate Attack" dated 1998.
Naiqian, Feng et al., "Study on the suppression effect of natural zeolite on expansion of concrete dur to alkali-aggregate reaction" dated 1998.
Chan, Sammy et al., "Comparative study of the initial surface absorption and chloride diffusion of high performance zeolite, silicia fume and PFA concrets" dated 1999.
Ding, Jian-Tong et al., "Extreme vertices design of concrete with combined mineral admixtures" dated 1999.
Poon, C.S. et al., "A study of the hydration of natural zeolite blended cement pastes" dated 1999.
Feng, N.-Q et al., "Zeolite ceramiste cellular concrete" dated 2000.
Bartlet-Gouedard, V. et al., "A Non-Conventional Way of Developing Cement Slurry for Geothermal Wells" dated 2001.
Smith, Dwight "Cementing" Society of Petroleum Engineers, pp. 14, 38.
Office action from U.S. Appl. No. 11/223,671, filed Dec. 15, 2005.
Office action from U.S. Appl. No. 11/271,431, filed Mar. 6, 2006.
Roddy, C. et al., "Methods of Use Settable Compositions Comprising Cement Kiln Dust" U.S. Appl. No. 11/223,671, filed Sep. 9, 2005.
Roddy, C. et al., "Methods of Using Foamed Settable Compositions Comprising Cement Kiln Dust" U.S. Appl. No. 11/223,485, filed Sep. 9, 2005.
Roddy, C. et al., "Foamed Settable Compositions Comprising Cement Kiln Dust," U.S. Appl. No. 11/223,703, filed Sep. 9, 2005.
Roddy, C. et al., "Methods of Using Settable Compositions Comprising Cement Kiln Dust and Additive(s)" U.S. Appl. No. 11/223,750, filed Sep. 9, 2005.
U.S. Appl. No. 11/402,741.
Search Report dated May 8, 2007.
Search Report dated Jul. 5, 2006.
Search Report dated Sep. 9, 2005.
Office Action dated Feb. 28, 2007 from U.S. Appl. No. 11/223,485.
Office Action dated Feb. 28, 2007 from U.S. Appl. No. 11/223,669.
Office Action dated Jun. 18, 2007 from U.S. Appl. No. 11/223,669.
Office Action dated Mar. 13, 2007 from U.S. Appl. No. 11/271,690.
Office Action dated Mar. 22, 2007 from U.S. Appl. No. 11/402,741.
Office Action dated May 29, 2007 from U.S. Appl. No. 11/402,741.
Office Action dated Aug. 10, 2007 from U.S. Appl. No. 11/257,261.
Office Action dated Dec. 21, 2006 from U.S. Appl. No. 11/484,951.
Office Action dated Oct. 26, 2006 from U.S. Appl. No. 11/484,951.
Notice of Allowance dated Aug. 3, 2007 from U.S. Appl. No. 11/223,485.
Notice of Allowance dated Jul. 2, 2007 from U.S. Appl. No. 11/416,754.
Notice of Allowance dated Aug. 13, 2007 from U.S. Appl. No. 11/271,690.
Manufacture of supplementary cementitious materials from cement kiln dust, Mishulovich et al., World Cement 91996), 27(3), p. 116-20. Abstract only.
Answer 3 of 5 Chemical Abstracts on STN "Alkali-activated binders by use of industrial by-products", Cement and Concrete Research (2005), 35(5), p. 968-973 Buchwald et al. abstract only.
Answer 3 of 24 Chemical Abstracts on STN "Effect of cement kiln dust substitution on chemical and physical properties and compressive strength of Portland and slag cements", Abd El-aleem et al. (2005), abstract only.
Answer 13 of 24 Chemical Abstracts on STN "Manufacture of ceramic particles from floatstone and fly ash", CN 1182062 (abstract only).
3M Scotchlite, Glass Bubbles Floated Product Series Product Information Brochure dated 1999.
Office action dated Aug. 15, 2006 from U.S. Appl. No. 11/271,431.
Office action dated Aug. 21, 2006 from U.S. Appl. No. 11/440,627.
Foreign communication related to a counterpart application dated Dec. 1, 2006.
Foreign communication related to a counterpart application dated Dec. 19, 2006.
Office Action from U.S. Appl. No. 11/223,669, filed Jan. 29, 2008.
Office action dated Feb. 2, 2007 from U.S. Appl. No. 11/402,741.
Smith, Dwight "Cementing" Society of Professional Engineers, 1987, pp. 14, 38.
Roddy, C. et al., "Methods of Using Settable Compositions Comprising Cement Kiln Dust" U.S. Appl. No. 11/271,690, filed Nov. 10, 2005.
Roddy, C. et al., "Settable Spotting Compositions Comprising Cement Kiln Dust" U.S. Appl. No. 11/271,431, filed Nov. 10, 2005.
Office action from U.S. Appl. No. 11/223,671, filed Mar. 31, 2006.
Roddy, C. et al., "Methods of Using Lightweight Settable Compositions Comprising Cement Kiln Dust" U.S. Appl. No. 11/416,563, filed May 3, 2006.
Roddy, C. et al., "Lightweight Settable Compositions Comprising Cement Kiln Dust" U.S. Appl. No. 11/416,754, filed May 3, 2006.
Office action from U.S. Appl. No. 11/271,431, filed May 17, 2006.
Roddy, C. et al., "Methods of Using Settable Compositions Comprising Cement Kiln Dust" U.S. Appl. No. 11/440,627, filed May 25, 2006.
Herndon, J. et al., "Setting Downhole Plugs: A State-of-the-Art" Petroleum Engineer International, Apr. 1978.
txi® Material Safety Data Sheet for Pressur-Seal.
Roddy, C. et al., "Cementing Compositions Comprising Cement Kiln Dust, Vitrified Shale, Zeolite, And/Or Amorphous Silica Utilizing . . . " U.S. Appl. No. 11/484,951, filed Jul. 12, 2006.
Office action dated Jul. 11, 2006 from U.S. Appl. No. 11/271,431.
Office action dated Jul. 21, 2006 from U.S. Appl. No. 11/416,563.
Office action dated Jul. 24, 2006 from U.S. Appl. No. 11/403,032.
Halliburton brochure entitled "Halad® -23 Fluid-Loss Additive" dated 2000.
Halliburton brochure entitled "Halad® -344 Fluid Loss Additive" dated 1998.
Halliburton brochure entitled "Halad® -413 Fluid-Loss Additive" dated 1998.
Halliburton brochure entitled "HR® -4 Cement Retarder" dated 1999.
Halliburton brochure entitled "HR® -5 Cement Additive" dated 1998.
Halliburton brochure entitled "HR® -7 Cement Retarder" dated 1999.
Halliburton brochure entitled HR® -12 Cement Retarder dated 1999.
Halliburton brochure entitled HR® -15 Cement Retarder dated 1999.
Halliburton brochure entitled "HR® -25 Cement Retarder" dated 1999.
Halliburton brochure entitled "SCR-100 Cement Retarder" dated 1999.
Halliburton brochure entitled "SCR-100 Cement Retarder—A Valuable Time Saver" dated 1994.

Halliburton brochure entitled "SCR-500L™ High-Temperature Retarder" dated 2000.
Halliburton brochure entitled "ACF-2 Foaming Agent" dated 1999.
Halliburton brochure entitled "Howco-Suds Surfactant" dated 1999.
Halliburton brochure entitled "HALAD® -23 Fluid-Loss Additive" dated 2000.
Halliburton brochure entitled "Halad® 413 Fluid-Loss Additive" dated 1999.
Halliburton brochure entitled "Pozmix® A Cement Additive" dated 1999.
Halliburton brochure entitled "Pozmix Cement & Pozmix 140" undated.
University of Maine, "Beneficial Use of Solid Waste in Maine" printed from the internet Apr. 14, 2005.
Smith, Dwight K., "Cementing" dated 1980, p. 38.
Parsons, R.L. et al., "Use of Cement Kiln Dust for the Stabilization of Soils" printed from the internet on Apr. 14, 2005.
Paper entitled "Kiln Dusts" printed from the internet on Apr. 14, 2005.
Paper entitled "Standards for the Management of Cement Kiln Dust Waste" printed from the internet Apr. 14, 2005.
Sersale, R. et al., "Portland-Zeolite-Cement For Minimizing Alkali-Aggregate Expansion" dated 1987.
Marfil, S.A. et al., "Zeolite Crystallization in Portland Cement Concrete Due to Alkali-Aggregate Reaction" dated 1993.
Janotka, I., "The Properties of Mortar Using Blends With Portland Cement Clinker, Zeolite Tuff and Gypsum" dated 1995.
Atkins, M. et al., "Zeolite P In Cements" Its Potential For Immobilizing Toxic and Radioactive Waste Species dated 1995.
Rogers, B.A. et al., "Designing a Remedial Acid Treatment for Gulf of Mexico Deepwater Turbidite Sands Containing Zeolite Cement" dated 1998.
Janotka, I. et al., "Effect of Bentonite and Zeolite on Durability of Cement Suspension under Sulfate Attack" dated 1998.
Naiqian, Feng et al., "Study of the suppression effect of natural zeolite on expansion of concrete due to alkali-aggregate reaction" dated 1998.
Chan, Sammy et al., "Comparative study of the initial surface absorption and chloride diffusion of high performance zeolite, silicia fume and PFA concretes" dated 1999.
Ding, Jian-Tong et al., "Extreme vertices design of concrete with combined mineral admixtures" dated 1999.
Poon, C.S. et al., "A study of the hydration of natural zeolite blended cement pastes" dated 1999.
Feng, N.-Q et al., "Zeolite ceramiste cellular concrete" dated 2000.
Bartlet-Gouedard, V. et al., "A Non-Conventional Way of Developing Cement Slurry of Geothermal Wells" dated 2001.
Roddy, Craig et al., patent application entitled "Methods of Using Settable Compositions Comprising Cement Kiln Dust" filed Sep. 9, 2005 as U.S. Appl. No. 11/223,671.
Roddy, Craig et al., patent application entitled "Methods of Using Foamed Settable Compositions Comprising Cement Kiln Dust" filed Sep. 9, 2005 as serial No. 223,485.
Roddy, Craig et al., application entitled "Methods of Using Settable Compositions Comprising Cement Kiln Dust and Additive(s)" filed Sep. 9, 2005 as U.S. Appl. No. 11/223,750.
Roddy, Craig et al., patent application entitled "Settable Compositions Comprising Cement Kiln Dust and Additive(s)" filed Sep. 9, 2005 as U.S. Appl. No. 11/223,669.
Office Action from U.S. Appl. No. 11/402,741, filed Sep. 6, 2007.
Office Action from U.S. Appl. No. 11/223,669, filed Oct. 9, 2007.
Office Action from U.S. Appl. No. 11/223,750, filed Oct. 16, 2007.
Final Office Action from U.S. Appl. No. 11/402,741, filed Oct. 24, 2007.
Office action dated Oct. 19, 2006 from U.S. Appl. No. 11/402,741.
Notice of Allowance from U.S. Appl. No. 11/416,754, filed Oct. 17, 2007.
Roddy, Craig et al., "Methods of Using Cement Compositions Comprising High Alumina Cement and Cement Kiln Dust" filed Oct. 24, 2005, U.S. Appl. No. 11/257,261.
Roddy, Craig et al., "Cement Compositions Comprising High Alumina Cement and Cement Kiln Dust" filed Oct. 24, 2005 , U.S. Appl. No. 11/256,824.
Foreign communication from a related counterpart application dated Oct. 27, 2006.
LaFarge North America Material Safety Data Sheet entitled "Cement Kiln Dust" dated Mar. 3, 2005.
LaFarge brochure entitled "TerraCem™" dated Aug. 2006.
LaFarge North America Material Safety Data Sheet entitled LaFarge Blended Cement (cement) dated Mar. 3, 2005.
Foreign communication from a related counterpart application dated Nov. 2, 2006.
Notice of Allowance from U.S. Appl. No. 11/257,261, filed Oct. 23, 2007.
Notice of Allowance from U.S. Appl. No. 11/223,750, filed Dec. 11, 2007.
Notice of Allowance from U.S. Appl. No. 11/402,741, filed Dec. 13, 2007.

* cited by examiner

FOAMED SETTABLE COMPOSITIONS COMPRISING CEMENT KILN DUST

BACKGROUND

The present invention relates to cementing operations and, more particularly, to settable compositions comprising water and cement kiln dust ("CKD"), and associated methods of use.

Settable compositions may be used in a variety of subterranean applications. As used herein, the term "settable composition" refers to any composition that over time will set to form a hardened mass. One example of a settable composition comprises hydraulic cement and water. Subterranean applications that may involve settable compositions include, but are not limited to, primary cementing, remedial cementing, and drilling operations. Settable compositions also may be used in surface applications, for example, construction cementing.

Settable compositions may be used in primary cementing operations whereby pipe strings, such as casing and liners, are cemented in well bores. In performing primary cementing, a settable composition may be pumped into an annular space between the walls of a well bore and the pipe string disposed therein. The settable composition sets in the annular space, thereby forming an annular sheath of hardened cement (e.g., a cement sheath) that supports and positions the pipe string in the well bore and bonds the exterior surface of the pipe string to the walls of the well bore.

Settable compositions also may be used in remedial cementing operations, such as sealing voids in a pipe string or a cement sheath. As used herein the term "void" refers to any type of space, including fractures, holes, cracks, channels, spaces, and the like. Such voids may include: holes or cracks in the pipe strings; holes, cracks, spaces, or channels in the cement sheath; and very small spaces (commonly referred to as "microannuli") between the cement sheath and the exterior surface of the well casing or formation. Sealing such voids may prevent the undesired flow of fluids (e.g., oil, gas, water, etc.) and/or fine solids into, or from, the well bore.

The sealing of such voids, whether or not made deliberately, has been attempted by introducing a substance into the void and permitting it to remain therein to seal the void. If the substance does not fit into the void, a bridge, patch, or sheath may be formed over the void to possibly produce a termination of the undesired fluid flow. Substances used heretofore in methods to terminate the undesired passage of fluids through such voids include settable compositions comprising water and hydraulic cement, wherein the methods employ hydraulic pressure to force the settable composition into the void. Once placed into the void, the settable composition may be permitted to harden.

Remedial cementing operations also may be used to seal portions of subterranean formations or portions of gravel packs. The portions of the subterranean formation may include permeable portions of a formation and fractures (natural or otherwise) in the formation and other portions of the formation that may allow the undesired flow of fluid into, or from, the well bore. The portions of the gravel pack include those portions of the gravel pack, wherein it is desired to prevent the undesired flow of fluids into, or from, the well bore. A "gravel pack" is a term commonly used to refer to a volume of particulate materials (such as sand) placed into a well bore to at least partially reduce the migration of unconsolidated formation particulates into the well bore. While screenless gravel packing operations are becoming more common, gravel packing operations commonly involve placing a gravel pack screen in the well bore neighboring a desired portion of the subterranean formation, and packing the surrounding annulus between the screen and the well bore with particulate materials that are sized to prevent and inhibit the passage of formation solids through the gravel pack with produced fluids. Among other things, this method may allow sealing of the portion of the gravel pack to prevent the undesired flow of fluids without requiring the gravel pack's removal.

Settable compositions also may be used during the drilling of the well bore in a subterranean formation. For example, in the drilling of a well bore, it may be desirable, in some instances, to change the direction of the well bore. In some instances, settable compositions may be used to facilitate this change of direction, for example, by drilling a pilot hole in a hardened mass of cement, commonly referred to as a "kickoff plug," placed in the well bore.

Certain formations may cause the drill bit to drill in a particular direction. For example, in a vertical well, this may result in an undesirable well bore deviation from vertical. In a directional well (which is drilled at an angle from vertical), after drilling an initial portion of the well bore vertically, the direction induced by the formation may make following the desired path difficult. In those and other instances, special directional drilling tools may be used, such as a whipstock, a bent sub-downhole motorized drill combination, and the like. Generally, the directional drilling tool or tools used may be orientated so that a pilot hole is produced at the desired angle to the previous well bore in a desired direction. When the pilot hole has been drilled for a short distance, the special tool or tools are removed, if required, and drilling along the new path may be resumed. To help ensure that the subsequent drilling follows the pilot hole, it may be necessary to drill the pilot hole in a kickoff plug, placed in the well bore. In those instances, prior to drilling the pilot hole, a settable composition may be introduced into the well bore and allowed to set to form a kickoff plug therein. The pilot hole then may be drilled in the kickoff plug, and the high strength of the kickoff plug helps ensure that the subsequent drilling proceeds in the direction of the pilot hole.

Settable compositions used heretofore commonly comprise Portland cement. Portland cement generally is a major component of the cost for the settable compositions. To reduce the cost of such settable compositions, other components may be included in the settable composition in addition to, or in place of, the Portland cement. Such components may include fly ash, slag cement, shale, metakaolin, micro-fine cement, and the like. "Fly ash," as that term is used herein, refers to the residue from the combustion of powdered or ground coal, wherein the fly ash carried by the flue gases may be recovered, for example, by electrostatic precipitation. "Slag," as that term is used herein, refers to a granulated, blast furnace by-product formed in the production of cast iron and generally comprises the oxidized impurities found in iron ore. Slag cement generally comprises slag and a base, for example, such as sodium hydroxide, sodium bicarbonate, sodium carbonate, or lime, to produce a settable composition that, when combined with water, may set to form a hardened mass.

During the manufacture of cement, a waste material commonly referred to as "CKD" is generated. "CKD," as that term is used herein, refers to a partially calcined kiln feed which is removed from the gas stream and collected in a dust collector during the manufacture of cement. Usually, large quantities of CKD are collected in the production of cement that are commonly disposed of as waste. Disposal of the waste CKD can add undesirable costs to the manufacture of the cement, as well as the environmental concerns associated with its disposal. The chemical analysis of CKD from various cement manufactures varies depending on a number of factors, including the particular kiln feed, the efficiencies of the cement production operation, and the associated dust collection systems. CKD generally may comprise a variety of oxides, such as $SiO_2$, $Al_2O_3$, $Fe_2O_3$, CaO, MgO, $SO_3$, $Na_2O$, and $K_2O$.

SUMMARY

The present invention relates to cementing operations and, more particularly, to settable compositions comprising water and CKD, and associated methods of use.

In one embodiment, the present invention provides a foamed settable composition comprising: water; CKD; a gas; and a surfactant.

Another embodiment of the present invention provides a foamed settable composition comprising: water; CKD in an amount in the range of from about 10% to about 50% by weight; Portland cement in an amount in the range of from about 50% to about 90% by weight; a gas; and a foaming and stabilizing surfactant composition.

The features and advantages of the present invention will be apparent to those skilled in the art. While numerous changes may be made by those skilled in the art, such changes are within the spirit of the invention.

DESCRIPTION OF PREFERRED EMBODIMENTS

The present invention relates to cementing operations and, more particularly, to settable compositions comprising water and CKD, and associated methods of use. The settable compositions of the present invention may be used in a variety of subterranean applications, including primary cementing, remedial cementing, and drilling operations. The settable compositions of the present invention also may be used in surface applications, for example, construction cementing.

Settable Compositions of the Present Invention

In one embodiment, a settable composition of the present invention comprises water and CKD. In some embodiments, a settable composition of the present invention may be foamed, for example, comprising water, CKD, a gas, and a surfactant. A foamed settable composition may be used, for example, where it is desired for the settable composition to be lightweight. Other optional additives may also be included in the settable compositions of the present invention as desired, including, but not limited to, hydraulic cement, fly ash, slag cement, shale, zeolite, metakaolin, combinations thereof, and the like.

The settable compositions of the present invention should have a density suitable for a particular application as desired by those of ordinary skill in the art, with the benefit of this disclosure. In some embodiments, the settable compositions of the present invention may have a density in the range of from about 8 pounds per gallon ("ppg") to about 16 ppg. In the foamed embodiments, the foamed settable compositions of the present invention may have a density in the range of from about 8 ppg to about 13 ppg.

The water used in the settable compositions of the present invention may include freshwater, saltwater (e.g., water containing one or more salts dissolved therein), brine (e.g., saturated saltwater produced from subterranean formations), seawater, or combinations thereof. Generally, the water may be from any source, provided that it does not contain an excess of compounds that may adversely affect other components in the settable composition. In some embodiments, the water may be included in an amount sufficient to form a pumpable slurry. In some embodiments, the water may be included in the settable compositions of the present invention in an amount in the range of from about 40% to about 200% by weight. As used herein, the term "by weight," when used herein to refer to the percent of a component in the settable composition, means by weight included in the settable compositions of the present invention relative to the weight of the dry components in the settable composition. In some embodiments, the water may be included in an amount in the range of from about 40% to about 150% by weight.

The CKD should be included in the settable compositions in an amount sufficient to provide the desired compressive strength, density, and/or cost reduction. In some embodiments, the CKD may be present in the settable compositions of the present invention in an amount in the range of from about 0.01% to 100% by weight. In some embodiments, the CKD may be present in the settable compositions of the present invention in an amount in the range of from about 5% to 100% by weight. In some embodiments, the CKD may be present in the settable compositions of the present invention in an amount in the range of from about 5% to about 80% by weight. In some embodiments, the CKD may be present in the settable compositions of the present invention in an amount in the range of from about 10% to about 50% by weight.

The settable compositions of the present invention may optionally comprise a hydraulic cement. A variety of hydraulic cements may be utilized in accordance with the present invention, including, but not limited to, those comprising calcium, aluminum, silicon, oxygen, iron, and/or sulfur, which set and harden by reaction with water. Suitable hydraulic cements include, but are not limited to, Portland cements, pozzolana cements, gypsum cements, high alumina content cements, slag cements, silica cements, and combinations thereof. In certain embodiments, the hydraulic cement may comprise a Portland cement. In some embodiments, the Portland cements that are suited for use in the present invention are classified as Classes A, C, H, and G cements according to American Petroleum Institute, *API Specification for Materials and Testing for Well Cements*, API Specification 10, Fifth Ed., Jul. 1, 1990.

Where present, the hydraulic cement generally may be included in the settable compositions in an amount sufficient to provide the desired compressive strength, density, and/or cost. In some embodiments, the hydraulic cement may be present in the settable compositions of the present invention in an amount in the range of from 0% to about 100% by weight. In some embodiments, the hydraulic cement may be present in the settable compositions of the present invention in an amount in the range of from 0% to about 95% by weight. In some embodiments, the hydraulic cement may be present in the settable compositions of the present invention in an amount in the range of from about 20% to about 95% by weight. In some embodiments, the hydraulic cement may be present in the settable compositions of the present invention in an amount in the range of from about 50% to about 90% by weight.

In some embodiments, a pozzolana cement that may be suitable for use comprises fly ash. A variety of fly ashes may be suitable, including fly ash classified as Class C and Class F fly ash according to American Petroleum Institute, *API Specification for Materials and Testing for Well Cements*, API Specification 10, Fifth Ed., Jul. 1, 1990. Class C fly ash comprises both silica and lime so that, when mixed with water, it sets to form a hardened mass. Class F fly ash generally does not contain sufficient lime, so an additional source of calcium ions is required for the Class F fly ash to form a settable composition with water. In some embodiments, lime may be mixed with Class F fly ash in an amount in the range of from about 0.1% to about 25% by weight of the fly ash. In some instances, the lime may be hydrated lime. Suitable examples of fly ash include, but are not limited to, "POZMIX® A" cement additive, commercially available from Halliburton Energy Services, Inc., Duncan, Okla.

Where present, the fly ash generally may be included in the settable compositions in an amount sufficient to provide the desired compressive strength, density, and/or cost. In some embodiments, the fly ash may be present in the settable compositions of the present invention in an amount in the range of from about 5% to about 75% by weight. In some embodiments, the fly ash may be present in the settable compositions of the present invention in an amount in the range of from about 10% to about 60% by weight.

In some embodiments, a slag cement that may be suitable for use may comprise slag. Slag generally does not contain sufficient basic material, so slag cement further may comprise a base to produce a settable composition that may react with water to set to form a hardened mass. Examples of suitable sources of bases include, but are not limited to, sodium hydroxide, sodium bicarbonate, sodium carbonate, lime, and combinations thereof.

Where present, the slag cement generally may be included in the settable compositions in an amount sufficient to provide the desired compressive strength, density, and/or cost. In some embodiments, the slag cement may be present in the settable compositions of the present invention in an amount in the range of from 0% to about 99.9% by weight. In some embodiments, the slag cement may be present in the settable compositions of the present invention in an amount in the range of from about 5% to about 75% by weight.

In certain embodiments, the settable compositions of the present invention further may comprise metakaolin. Generally, metakaolin is a white pozzolan that may be prepared by heating kaolin clay, for example, to temperatures in the range of from about 600° to about 800° C. In some embodiments, the metakaolin may be present in the settable compositions of the present invention in an amount in the range of from about 5% to about 95% by weight. In some embodiments, the metakaolin may be present in an amount in the range of from about 10% to about 50% by weight.

In certain embodiments, the settable compositions of the present invention further may comprise shale. Among other things, shale included in the settable compositions may react with excess lime to form a suitable cementing material, for example, calcium silicate hydrate. A variety of shales are suitable, including those comprising silicon, aluminum, calcium, and/or magnesium. An example of a suitable shale comprises vitrified shale. Suitable examples of vitrified shale include, but are not limited to, "PRESSUR-SEAL® FINE LCM" material and "PRESSUR-SEAL® COARSE LCM" material, which are commercially available from TXI Energy Services, Inc., Houston, Tex. Generally, the shale may have any particle size distribution as desired for a particular application. In certain embodiments, the shale may have a particle size distribution in the range of from about 37 micrometers to about 4,750 micrometers.

Where present, the shale may be included in the settable compositions of the present invention in an amount sufficient to provide the desired compressive strength, density, and/or cost. In some embodiments, the shale may be present in an amount in the range of from about 5% to about 75% by weight. In some embodiments, the shale may be present in an amount in the range of from about 10% to about 35% by weight. One of ordinary skill in the art, with the benefit of this disclosure, will recognize the appropriate amount of the shale to include for a chosen application.

In certain embodiments, the settable compositions of the present invention further may comprise zeolite. Zeolites generally are porous alumino-silicate minerals that may be either a natural or synthetic material. Synthetic zeolites are based on the same type of structural cell as natural zeolites, and may comprise aluminosilicate hydrates. As used herein, the term "zeolite" refers to all natural and synthetic forms of zeolite.

In certain embodiments, suitable zeolites for use in present invention may include "analcime" (which is hydrated sodium aluminum silicate), "bikitaite" (which is lithium aluminum silicate), "brewsterite" (which is hydrated strontium barium calcium aluminum silicate), "chabazite" (which is hydrated calcium aluminum silicate), "clinoptilolite" (which is hydrated sodium aluminum silicate), "faujasite" (which is hydrated sodium potassium calcium magnesium aluminum silicate), "harmotome" (which is hydrated barium aluminum silicate), "heulandite" (which is hydrated sodium calcium aluminum silicate), "laumontite" (which is hydrated calcium aluminum silicate), "mesolite" (which is hydrated sodium calcium aluminum silicate), "natrolite" (which is hydrated sodium aluminum silicate), "paulingite" (which is hydrated potassium sodium calcium barium aluminum silicate), "phillipsite" (which is hydrated potassium sodium calcium aluminum silicate), "scolecite" (which is hydrated calcium aluminum silicate), "stellerite" (which is hydrated calcium aluminum silicate), "stilbite" (which is hydrated sodium calcium aluminum silicate), and "thomsonite" (which is hydrated sodium calcium aluminum silicate), and combinations thereof. In certain embodiments, suitable zeolites for use in the present invention include chabazite and clinoptilolite. An example of a suitable source of zeolite is available from the C2C Zeolite Corporation of Calgary, Canada.

In some embodiments, the zeolite may be present in the settable compositions of the present invention in an amount in the range of from about 5% to about 65% by weight. In certain embodiments, the zeolite may be present in an amount in the range of from about 10% to about 40% by weight.

In certain embodiments, the settable compositions of the present invention further may comprise a set retarding additive. As used herein, the term "set retarding additive" refers to an additive that retards the setting of the settable compositions of the present invention. Examples of suitable set retarding additives include, but are not limited to, ammonium, alkali metals, alkaline earth metals, metal salts of sulfoalkylated lignins, hydroxycarboxy acids, copolymers that comprise acrylic acid or maleic acid, and combinations thereof. One example of a suitable sulfoalkylate lignin comprises a sulfomethylated lignin. Suitable set retarding additives are disclosed in more detail in U.S. Pat. No. Re. 31,190, the entire disclosure of which is incorporated herein by reference. Suitable set retarding additives are commercially available from Halliburton Energy Services, Inc. under the tradenames "HR® 4," "HR® 5," HR® 7," "HR® 12," "HR® 15," HR® 25," "SCR™ 100," and "SCR™ 500." Generally, where used, the set retarding additive may be included in the settable compositions of the present invention in an amount sufficient to provide the desired set retardation. In some embodiments, the set retarding additive may be present in an amount in the range of from about 0.1% to about 5% by weight.

Optionally, other additional additives may be added to the settable compositions of the present invention as deemed appropriate by one skilled in the art, with the benefit of this disclosure. Examples of such additives include, but are not limited to, accelerators, weight reducing additives, heavyweight additives, lost circulation materials, filtration control additives, dispersants, and combinations thereof. Suitable examples of these additives include crystalline silica compounds, amorphous silica, salts, fibers, hydratable clays, microspheres, pozzolan lime, latex cement, thixotropic additives, combinations thereof and the like.

An example of a settable composition of the present invention may comprise water and CKD. As desired by one of ordinary skill in the art, with the benefit of this disclosure, such settable composition of the present invention further may comprise any of the above-listed additives, as well any of a variety of other additives suitable for use in subterranean applications.

Another example of a settable composition of the present invention may comprise water and CKD, and an additive comprising at least one of the following group: fly ash; shale; zeolite; slag cement; metakaolin; and combinations thereof. As desired by one of ordinary skill in the art, with the benefit of this disclosure, such settable composition of the present invention further may comprise any of the above-listed additives, as well any of a variety of other additives suitable for use in subterranean applications.

As mentioned previously, in certain embodiments, the settable compositions of the present invention may be foamed with a gas. In some embodiments, foamed settable compositions of the present invention may comprise water, CKD, a gas, and a foaming and stabilizing surfactant composition. Other suitable additives, such as those discussed previously, also may be included in the foamed settable compositions of the present invention as desired by those of ordinary skill in the art, with the benefit of this disclosure. The gas used in the foamed settable compositions of the present invention may be any gas suitable for foaming a settable composition, including, but not limited to, air, nitrogen, or combinations thereof. Generally, the gas should be present in the foamed settable compositions of the present invention in an amount sufficient to form the desired foam. In certain embodiments, the gas may be present in the foamed settable compositions of the present invention in an amount in the range of from about 10% to about 80% by volume of the composition.

Where foamed, the settable compositions of the present invention further comprise a surfactant. In some embodiments, the surfactant comprises a foaming and stabilizing surfactant composition. As used herein, a "foaming and stabilizing surfactant composition" refers to a composition that comprises one or more surfactants and, among other things, may be used to facilitate the foaming of a settable composition and also may stabilize the resultant foamed settable composition formed therewith. Any suitable foaming and stabilizing surfactant composition may be used in the settable compositions of the present invention. Suitable foaming and stabilizing surfactant compositions may include, but are not limited to: mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; hydrolyzed keratin; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof. In one certain embodiment, the foaming and stabilizing surfactant composition comprises a mixture of an ammonium salt of an alkyl ether sulfate, a cocoamidopropyl betaine surfactant, a cocoamidopropyl dimethylamine oxide surfactant, sodium chloride, and water. A suitable example of such a mixture is "ZONESEAL® 2000" foaming additive, commercially available from Halliburton Energy Services, Inc. Suitable foaming and stabilizing surfactant compositions are described in U.S. Pat. Nos. 6,797,054, 6,547,871, 6,367,550, 6,063,738, and 5,897,699, the entire disclosures of which are incorporated herein by reference.

Generally, the surfactant may be present in the foamed settable compositions of the present invention in an amount sufficient to provide a suitable foam. In some embodiments, the surfactant composition may be present in an amount in the range of from about 0.8% and about 5% by volume of the water ("bvow").

Methods of the Present Invention

The settable compositions of the present invention may be used in a variety of subterranean applications, including, but not limited to, primary cementing, remedial cementing, and drilling operations. The settable compositions of the present invention also may be used in surface applications, for example, construction cementing.

An example of a method of the present invention comprises providing a settable composition of the present invention comprising water and CKD; placing the settable composition in a location to be cemented; and allowing the settable composition to set therein. In some embodiments, the location to be cemented may be above ground, for example, in construction cementing. In some embodiments, the location to be cemented may be in a subterranean formation, for example, in subterranean applications. In some embodiments, the settable compositions of the present invention may be foamed. As desired by one of ordinary skill in the art, with the benefit of this disclosure, the settable compositions of the present invention useful in this method further may comprise any of the above-listed additives, as well any of a variety of other additives suitable for use in subterranean applications.

Another example of a method of the present invention is a method of cementing a pipe string (e.g., casing, expandable casing, liners, etc.) disposed in a well bore. An example of such a method may comprise providing a settable composition of the present invention comprising water and CKD; introducing the settable composition into the annulus between the pipe string and a wall of the well bore; and allowing the settable composition to set in the annulus to form a hardened mass. Generally, in most instances, the hardened mass should fix the pipe string in the well bore. In some embodiments, the settable compositions of the present invention may be foamed. As desired by one of ordinary skill in the art, with the benefit of this disclosure, the settable compositions of the present invention useful in this method further may comprise any of the above-listed additives, as well any of a variety of other additives suitable for use in subterranean application.

Another example of a method of the present invention is method of sealing a portion of a gravel pack or a portion of a subterranean formation. An example of such a method may comprise providing a settable composition of the present invention comprising water and CKD; introducing the settable composition into the portion of the gravel pack or the portion of the subterranean formation; and allowing the settable composition to form a hardened mass in the portion. The portions of the subterranean formation may include permeable portions of the formation and fractures (natural or otherwise) in the formation and other portions of the formation that may allow the undesired flow of fluid into, or from, the well bore. The portions of the gravel pack include those portions of the gravel pack, wherein it is desired to prevent the undesired flow of fluids into, or from, the well bore. Among other things, this method may allow the sealing of the portion of the gravel pack to prevent the undesired flow of fluids without requiring the gravel pack's removal. In some embodiments, the settable compositions of the present invention may be foamed. As desired by one of ordinary skill in the art, with the benefit of this disclosure, the settable compositions of the present invention useful in this method further may comprise any of the above-listed additives, as well any of a variety of other additives suitable for use in subterranean applications.

Another example of a method of the present invention is a method of sealing voids located in a pipe string (e.g., casing, expandable casings, liners, etc.) or in a cement sheath. Generally, the pipe string will be disposed in a well bore, and the cement sheath may be located in the annulus between the pipe string disposed in the well bore and a wall of the well bore. An example of such a method may comprise providing a settable composition comprising water and CKD; introducing the settable composition into the void; and allowing the settable composition to set to form a hardened mass in the void. In some embodiments, the settable compositions of the present invention may be foamed. As desired by one of ordinary skill in the art, with the benefit of this disclosure, the settable compositions of the present invention useful in this method further may comprise any of the above-listed additives, as well any of a variety of other additives suitable for use in subterranean applications.

When sealing a void in a pipe string, the methods of the present invention, in some embodiments, further may comprise locating the void in the pipe string; and isolating the void by defining a space within the pipe string in communication with the void; wherein the settable composition may be introduced into the void from the space. The void may be isolated using any suitable technique and/or apparatus, including bridge plugs, packers, and the like. The void in the pipe string may be located using any suitable technique.

When sealing a void in the cement sheath, the methods of the present invention, in some embodiments, further may comprise locating the void in the cement sheath; producing a perforation in the pipe string that intersects the void; and isolating the void by defining a space within the pipe string in communication with the void via the perforation, wherein the settable composition is introduced into the void via the perforation. The void in the pipe string may be located using any suitable technique. The perforation may be created in the pipe string using any suitable technique, for example, perforating guns. The void may be isolated using any suitable technique and/or apparatus, including bridge plugs, packers, and the like.

Another example of a method of the present invention is a method of changing the direction of drilling a well bore. An example of such a method may comprise providing a settable composition comprising CKD; introducing the settable composition into the well bore at a location in the well bore wherein the direction of drilling is to be changed; allowing the settable composition to set to form a kickoff plug in the well bore; drilling a hole in the kickoff plug; and drilling of the well bore through the hole in the kickoff plug. In some embodiments, the settable compositions of the present invention may be foamed. As desired by one of ordinary skill in the art, with the benefit of this disclosure, the settable compositions of the present invention useful in this method further may comprise any of the above-listed additives, as well any of a variety of other additives suitable for use in subterranean applications.

Generally, the drilling operation should continue in the direction of the hole drilled through the kickoff plug. The well bore and hole in the kickoff plug may be drilled using any suitable technique, including rotary drilling, cable tool drilling, and the like. In some embodiments, one or more oriented directional drilling tools may be placed adjacent to the kickoff plug. Suitable directional drilling tools include, but are not limited to, whip-stocks, bent sub-downhole motorized drill combinations, and the like. The direction drilling tools then may be used to drill the hole in the kickoff plug so that the hole is positioned in the desired direction. Optionally, the directional drilling tool may be removed from the well bore subsequent to drilling the hole in the kickoff plug.

To facilitate a better understanding of the present invention, the following examples of certain aspects of some embodiments are given. In no way should the following examples be read to limit, or define, the scope of the invention.

EXAMPLE 1

A series of sample settable compositions were prepared at room temperature and subjected to 48-hour compressive strength tests at 140° F. in accordance with API Specification 10. The sample compositions comprised water, Class A CKD, and Class A Portland cement.

The results of the compressive strength tests are set forth in the table below.

TABLE 1

Unfoamed Compressive Strength Tests:
Class A Cement and Class A CKD

| Sample | Density (ppg) | Portland Cement Class A (% by wt) | CKD Class A (% by wt) | 48-Hour Compressive Strength at 140° F. (psi) |
|---|---|---|---|---|
| No. 1 | 14 | 0 | 100 | 228 |
| No. 2 | 15.15 | 25 | 75 | 701 |
| No. 3 | 14.84 | 50 | 50 | 1,189 |
| No. 4 | 15.62 | 75 | 25 | 3,360 |
| No. 5 | 15.6 | 100 | 0 | 2,350 |

EXAMPLE 2

Sample Compositions No. 6 and 7 were prepared at room temperature and subjected to thickening time and fluid loss tests at 140° F. and 240° F., respectively, in accordance with API Specification 10.

Sample Composition No. 6 comprised water, Class A Portland Cement (50% by weight), Class A CKD (50% by weight), "HALAD® 23" fluid loss control additive (0.75% by weight), and "HR®-5" set retarder (0.25% by weight). Accordingly, Sample Composition No. 6 had a Portland cement-to-CKD weight ratio of about 50:50. This Sample had a density of 14.84 ppg. "HALAD® 23" additive is a cellulose-based fluid loss control additive that is commercially available from Halliburton Energy Services, Inc., Duncan, Okla. "HR®-5" retarder is a lignosulfonate set retarder that is commercially available from Halliburton Energy Services, Inc., Duncan, Okla.

Sample Composition No. 7 comprised water, Class A Portland Cement (50% by weight), Class A CKD (50% by weight), "HALAD® 413" fluid loss control additive (0.75% by weight), and "HR®-12" set retarder (0.3% by weight). Accordingly, Sample Composition No. 7 had a Portland cement-to-CKD weight ratio of 50:50. This Sample had a density of 14.84 ppg. "HALAD® 413" additive is a grafted copolymer fluid loss control additive that is commercially available from Halliburton Energy Services, Inc., Duncan, Okla. "HR®-12" retarder is a mixture of a lignosulfonate and hydroxycarboxy acid set retarder that is commercially available from Halliburton Energy Services, Inc., Duncan, Okla.

The results of the fluid loss and thickening time tests are set forth in the table below.

TABLE 2

Unfoamed Thickening Time and Fluid Loss Tests:
Class A Cement and Class A CKD

| Sample | Cement-to-CKD Weight Ratio | Test Temperature (° F.) | Thickening Time to 70 BC (min:hr) | API Fluid Loss in 30 min (ml) |
|---|---|---|---|---|
| No. 6 | 50:50 | 140 | 6:06 | 147 |
| No. 7 | 50:50 | 240 | 2:20 | 220 |

EXAMPLE 3

A series of sample settable compositions were prepared at room temperature and subjected to 48-hour compressive strength tests at 140° F. in accordance with API Specification 10. The sample compositions comprised water, Class H CKD, and Class H Portland cement.

The results of the compressive strength tests are set forth in the table below.

TABLE 3

Unfoamed Compressive Strength Tests:
Class H Cement and Class H CKD

| Sample | Density (ppg) | Portland Cement Class H (% by wt) | CKD Class H (% by wt) | 48-Hour Compressive Strength at 140° F. (psi) |
|---|---|---|---|---|
| No. 8 | 15.23 | 0 | 100 | 74.9 |
| No. 9 | 15.4 | 25 | 75 | 544 |
| No. 10 | 16 | 50 | 50 | 1,745 |
| No. 11 | 16.4 | 75 | 25 | 3,250 |
| No. 12 | 16.4 | 100 | 0 | 1,931 |

EXAMPLE 4

Sample Compositions No. 13 and 14 were prepared at room temperature and subjected to thickening time and fluid loss tests at 140° F. and 240° F., respectively, in accordance with API Specification 10.

Sample Composition No. 13 comprised water, Class H Portland Cement (50% by weight), Class H CKD (50% by weight), "HALAD® 23" fluid loss control additive (0.75% by weight), and 0.25% by weight "HR®-5" set retarder (0.25% by weight). Accordingly, Sample Composition No. 13 had a Portland cement-to-CKD weight ratio of about 50:50. This Sample had a density of 16 ppg.

Sample Composition No. 14 comprised water, Class H Portland Cement (50% by weight), Class H CKD (50% by weight), "HALAD® 413" fluid loss control additive (0.75% by weight), and "HR®-12" set retarder (0.3% by weight). Accordingly, Sample Composition No. 14 had a Portland cement-to-CKD weight ratio of about 50:50. This Sample had a density of 16 ppg.

The results of the fluid loss and thickening time tests are set forth in the table below.

TABLE 4

Unfoamed Thickening Time and Fluid Loss Tests:
Class H Cement and Class H CKD

| Sample | Cement-to-CKD Weight Ratio | Test Temperature (° F.) | Thickening Time to 70 BC (min:hr) | API Fluid Loss in 30 min (ml) |
|---|---|---|---|---|
| No. 13 | 50:50 | 140 | 5:04 | 58 |
| No. 14 | 50:50 | 240 | 1:09 | 220 |

EXAMPLE 5

A series of sample settable compositions were prepared at room temperature and subjected to 48-hour compressive strength tests at 140° F. in accordance with API Specification 10. The sample compositions comprised water, Class G CKD, and Class G Portland cement.

The results of the compressive strength tests are set forth in the table below.

TABLE 5

Unfoamed Compressive Strength Tests:
Class G Cement and Class G CKD

| Sample | Density (ppg) | Portland Cement Class G (% by wt) | CKD Class G (% by wt) | 48-Hour Compressive Strength at 140° F. (psi) |
|---|---|---|---|---|
| No. 15 | 14.46 | 0 | 100 | 371 |
| No. 16 | 14.47 | 25 | 75 | 601 |
| No. 17 | 14.49 | 50 | 50 | 1,100 |
| No. 18 | 14.46 | 75 | 25 | 3,160 |
| No. 19 | 14.46 | 100 | 0 | 3,880 |

EXAMPLE 6

Sample Compositions No. 20 and 21 were prepared at room temperature and subjected to thickening time and fluid loss tests at 140° F. and 240° F., respectively, in accordance with API Specification 10.

Sample Composition No. 20 comprised water, Class G Portland Cement (50% by weight), Class G CKD (50% by weight), "HALAD® 23" fluid loss control additive (0.75% by weight), and "HR®-5" set retarder (0.25% by weight). Accordingly, Sample Composition No. 20 had a Portland cement-to-CKD weight ratio of about 50:50. This Sample had a density of 15.23 ppg.

Sample Composition No. 21 comprised water, Class G Portland Cement (50% by weight), Class G CKD (50% by weight), "HALAD® 413" fluid loss control additive (0.75% by weight), and "HR®-12" set retarder (0.3% by weight). Accordingly, Sample Composition No. 21 had a Portland cement-to-CKD weight ratio of about 50:50. This Sample had a density of 15.23 ppg.

The results of the fluid loss and thickening time tests are set forth in the table below.

TABLE 6

Unfoamed Thickening Time and Fluid Loss Tests:
Class G Cement and Class G CKD

| Sample | Cement-to-CKD Weight Ratio | Test Temperature (° F.) | Thickening Time to 70 BC (min:hr) | API Fluid Loss in 30 min (ml) |
|---|---|---|---|---|
| No. 20 | 50:50 | 140 | 3:19 | 132 |
| No. 21 | 50:50 | 240 | 1:24 | 152 |

Accordingly, Examples 1-6 indicate that settable compositions comprising Portland cement and CKD may have suitable thickening times, compressive strengths, and/or fluid loss properties for a particular application.

EXAMPLE 7

A series of foamed sample compositions were prepared in accordance with the following procedure. For each sample, a base sample composition was prepared that comprised water, Class A Portland cement, and Class A CKD. The amounts of CKD and Portland cement were varied as shown in the table below. "ZONESEAL® 2000" foaming additive was then added to each base sample composition in an amount of 2% bvow. Next, each base sample composition was foamed down to about 12 ppg. After preparation, the resulting foamed sample compositions were subjected to 72-hour compressive strength tests at 140° F. in accordance with API Specification 10.

The results of the compressive strength tests are set forth in the table below

TABLE 7

Foamed Compressive Strength Test:
Class A Cement and Class A CKD

| Sample | Base Density (ppg) | Foam Density (ppg) | Portland Cement Class A (% by wt) | CKD Class A (% by wt) | 72-Hour Compressive Strength at 140° F. (psi) |
|---|---|---|---|---|---|
| No. 22 | 14.34 | 12 | 0 | 100 | 167.6 |
| No. 23 | 14.15 | 12 | 25 | 75 | 701 |
| No. 24 | 15.03 | 12 | 50 | 50 | 1,253 |
| No. 25 | 15.62 | 12 | 75 | 25 | 1,322 |
| No. 26 | 15.65 | 12 | 100 | 0 | 1,814 |

EXAMPLE 8

A series of foamed sample compositions were prepared in accordance with the following procedure. For each sample, a base sample composition was prepared that comprised water, Class H Portland cement, and Class H CKD. The amounts of CKD and Portland cement were varied as shown in the table below. "ZONESEAL® 2000" foaming additive was then added to each base sample composition in an amount of 2% bvow. Next, each base sample composition was foamed down to about 12 ppg. After preparation, the resulting foamed sample compositions were subjected to 72-hour compressive strength tests at 140° F. in accordance with API Specification 10.

The results of the compressive strength tests are set forth in the table below.

TABLE 8

Foamed Compressive Strength Tests:
Class H Cement and Class H CKD

| Sample | Base Density (ppg) | Foam Density (ppg) | Portland Cement Class H (% by wt) | CKD Class H (% by wt) | 72-Hour Compressive Strength at 140° F. (psi) |
|---|---|---|---|---|---|
| No. 27 | 15.07 | 12 | 0 | 100 | 27.2 |
| No. 28 | 15.4 | 12 | 25 | 75 | 285 |
| No. 29 | 16 | 12 | 50 | 50 | 845 |
| No. 30 | 16.4 | 12 | 75 | 25 | 1,458 |
| No. 31 | 16.57 | 12 | 100 | 0 | 1,509 |

EXAMPLE 9

A series of foamed sample compositions were prepared in accordance with the following procedure. For each sample, a base sample composition was prepared that comprised water, Class G Portland cement, and Class G CKD. The amounts of CKD and Portland cement were varied as shown in the table below. "ZONESEAL® 2000" foaming additive was then added to each base sample composition in an amount of 2% bvow. Next, each base sample composition was foamed down to about 12 ppg. After preparation, the resulting foamed sample compositions were subjected to 72-hour compressive strength tests at 140° F. in accordance with API Specification 10.

The results of the compressive strength tests are set forth in the table below.

TABLE 9

Foamed Compressive Strength Tests:
Class G Cement and Class G CKD

| Sample | Base Density (ppg) | Foam Density (ppg) | Portland Cement Class G (% by wt) | CKD Class G (% by wt) | 72-Hour Compressive Strength at 140° F. (psi) |
|---|---|---|---|---|---|
| No. 32 | 14.32 | 12 | 0 | 100 | 181 |
| No. 33 | 14.61 | 12 | 25 | 75 | 462 |
| No. 34 | 15 | 12 | 50 | 50 | 729 |
| No. 35 | 15.43 | 12 | 75 | 25 | 1,196 |
| No. 36 | 15.91 | 12 | 100 | 0 | 1,598 |

Accordingly, Examples 7-9 indicate that foamed settable compositions comprising Portland cement and CKD may have suitable compressive strengths for a particular application.

EXAMPLE 10

A series of sample settable compositions were prepared at room temperature and subjected to 24-hour compressive strength tests at 140° F. in accordance with API Specification 10. Sufficient water was included in each sample to provide a density of about 14.2 ppg.

The results of the compressive strength tests are set forth in the table below.

TABLE 10

Unfoamed Compressive Strength Tests

Class A Cement, Class A CKD, Shale, Fly Ash, and Lime

| Sample | Portland Cement Class A (% by wt) | CKD Class A (% by wt) | Vitrified Shale[1] (% by wt) | POZMIX ® A Additive (% by wt) | Hydrated Lime (% by wt) | 24-Hour Compressive Strength at 140° F. (psi) |
|---|---|---|---|---|---|---|
| No. 37 | 26 | 0 | 0 | 61 | 13 | 1,024 |
| No. 38 | 19.5 | 6.5 | 0 | 61 | 13 | 766 |
| No. 39 | 20.7 | 5.3 | 0 | 61 | 13 | 825 |
| No. 40 | 23.3 | 2.7 | 0 | 61 | 13 | 796 |
| No. 41 | 19.4 | 3.3 | 3.3 | 61 | 13 | 717 |
| No. 42 | 20.7 | 2.65 | 2.65 | 61 | 13 | 708 |
| No. 43 | 23.3 | 1.35 | 1.35 | 61 | 13 | 404 |

[1]The vitrified shale used was "PRESSUR-SEAL ® FINE LCM" material.

EXAMPLE 11

A series of sample compositions were prepared and subjected to thickening time tests at 140° F. in accordance with API Specification 10.

Sample Composition No. 44 comprised water, Class A Portland Cement (26% by weight), "POZMIX® A" cement additive (61% by weight), hydrated lime (13% by weight), "HALAD® 23" fluid loss control additive (0.6% by weight), and "HR®-5" set retarder (0.1% by weight). This Sample had a density of 14.2 ppg.

Sample Composition No. 45 comprised water, Class A Portland Cement (19.5% by weight), Class A CKD (6.5% by weight), "POZMIX® A" cement additive (61% by weight), hydrated lime (13% by weight), "HALAD® 23" fluid loss control additive (0.6% by weight), and "HR®-5" set retarder (0.1% by weight). This Sample had a density of 14.2 ppg. The vitrified shale was "PRESSUR-SEAL® FINE LCM" material.

Sample Composition No. 46 comprised water, Class A Portland Cement (19.5% by weight), Class A CKD (3.25% by weight), vitrified shale (3.25% by weight), "POZMIX® A" cement additive (61% by weight), hydrated lime (13% by weight), "HALAD® 23" fluid loss control additive (0.6% by weight), and "HR®-5" set retarder (0.1% by weight). This Sample had a density of 14.2 ppg. The vitrified shale was "PRESSUR-SEAL® FINE LCM" material.

The results of the fluid loss and thickening time tests are set forth in the table below.

TABLE 11

Unfoamed Thickening Time Tests:

Class A Cement, Class A CKD, Shale, Fly ash, and Lime

| Sample | Portland Cement Class A (% by wt) | CKD Class A (% by wt) | Vitrified Shale[1] (% by wt) | POZMIX ® A Additive (% by wt) | Hydrated Lime (% by wt) | Thickening Time to 70 BC at 140° F. (min:hr) |
|---|---|---|---|---|---|---|
| No. 44 | 26 | 0 | 0 | 61 | 13 | 2:57 |
| No. 45 | 19.5 | 6.5 | 0 | 61 | 13 | 2:20 |
| No. 46 | 19.5 | 2.25 | 2.25 | 61 | 13 | 3:12 |

[1]The vitrified shale used was "PRESSUR-SEAL ® FINE LCM" material.

EXAMPLE 12

A series of sample settable compositions were prepared at room temperature and subjected to 24-hour compressive strength tests at 140° F. in accordance with API Specification 10. Sufficient water was included in each sample to provide a density of about 14.2 ppg.

The results of the compressive strength tests are set forth in the table below.

TABLE 12

Unfoamed Compressive Strength Tests:
Class H Cement, Class H CKD, Shale, Fly ash, and Lime

| Sample | Portland Cement Class H (% by wt) | CKD Class H (% by wt) | Vitrified Shale[1] (% by wt) | POZMIX ® A Additive (% by wt) | Hydrated Lime (% by wt) | 24-Hour Compressive Strength at 140° F. (psi) |
|---|---|---|---|---|---|---|
| No. 47 | 26 | 0 | 0 | 61 | 13 | 704 |
| No. 48 | 19.5 | 6.5 | 0 | 61 | 13 | 576 |
| No. 49 | 20.7 | 5.3 | 0 | 61 | 13 | 592 |
| No. 50 | 23.3 | 2.7 | 0 | 61 | 13 | 627 |
| No. 51 | 19.4 | 3.3 | 3.3 | 61 | 13 | 626 |
| No. 52 | 20.7 | 2.65 | 2.65 | 61 | 13 | 619 |
| No. 53 | 23.3 | 1.35 | 1.35 | 61 | 13 | 594 |

[1]The vitrified shale used was "PRESSUR-SEAL ® FINE LCM" material.

EXAMPLE 13

Sample Composition No. 54 was prepared and subjected to a fluid loss test at 140° F. in accordance with API Specification 10. Sample Composition No. 54 comprised water, Class H Portland Cement (19.5% by weight), Class H CKD (3.3% by weight), vitrified shale (3.3% by weight), "POZMIX® A" cement additive (61% by weight), hydrated lime (13% by weight), "HALAD® 23" fluid loss control additive (0.6% by weight), and "HR®-5" set retarder (0.1% by weight). This Sample had a density of 14.2 ppg. Accordingly, Sample Composition No. 54 had a Portland cement-to-CKD weight ratio of 75:25. The vitrified shale was "PRESSUR-SEAL® FINE LCM" material.

The result of this fluid loss test is set forth in the table below.

EXAMPLE 14

A series of sample settable compositions were prepared at room temperature and subjected to 24-hour compressive strength tests at 140° F. in accordance with API Specification 10. Sufficient water was included in each sample to provide a density of about 14.2 ppg.

The results of the compressive strength tests are set forth in the table below.

TABLE 13

Unfoamed Fluid Loss Test:
Class H Cement, Class H CKD, Shale, Fly ash, and Lime

| Sample | Portland Cement Class H (% by wt) | CKD Class H (% by wt) | Vitrified Shale[1] (% by wt) | POZMIX ® A Additive (% by wt) | Hydrated Lime (% by wt) | Fluid Loss in 30 min API at 140° F. (ml) |
|---|---|---|---|---|---|---|
| No. 54 | 19.5 | 3.3 | 3.3 | 61 | 13 | 117 |

[1]The vitrified shale used was "PRESSUR-SEAL ® FINE LCM" material.

TABLE 14

Unfoamed Compressive Strength Tests:
Class G Cement, Class G CKD, Shale, Fly ash, and Lime

| Sample | Portland Cement Class G (% by wt) | CKD Class G (% by wt) | Vitrified Shale[1] (% by wt) | POZMIX ® A Additive (% by wt) | Hydrated Lime (% by wt) | 24-Hour Compressive Strength at 140° F. (psi) |
|---|---|---|---|---|---|---|
| No. 55 | 26 | 0 | 0 | 61 | 13 | 491 |
| No. 56 | 19.5 | 6.5 | 0 | 61 | 13 | 526 |
| No. 57 | 20.7 | 5.3 | 0 | 61 | 13 | 474 |
| No. 58 | 23.3 | 2.7 | 0 | 61 | 13 | 462 |
| No. 59 | 19.4 | 3.3 | 3.3 | 61 | 13 | 523 |
| No. 60 | 20.7 | 2.65 | 2.65 | 61 | 13 | 563 |

[1]The vitrified shale used was "PRESSUR-SEAL ® FINE LCM" material.

Accordingly, Examples 10-14 indicate that settable compositions comprising Portland cement, CKD, fly ash, hydrated lime, and optionally vitrified shale may have suitable compressive strengths, thickening times, and/or fluid loss properties for a particular application.

EXAMPLE 15

A series of foamed sample compositions were prepared in accordance with the following procedure. For each sample, a base sample composition was prepared that comprised water, Class A Portland cement, Class A CKD, vitrified shale, "POZMIX® A" cement additive (61% by weight), and hydrated lime (13% by weight). This Sample had a density of 14.2 ppg. The vitrified shale used was "PRESSUR-SEAL® FINE LCM" material. The amounts of CKD, Portland cement, and vitrified shale were varied as shown in the table below. "ZONESEAL® 2000" foaming additive was then added to each base sample composition in an amount of 2% bvow. Next, each base sample composition was foamed down to about 12 ppg. After preparation, the resulting foamed sample compositions were subjected to 10-day compressive strength tests at 140° F. in accordance with API Specification 10.

The results of the compressive strength tests are set forth in the table below.

TABLE 15

Foamed Compressive Strength Tests:
Class A Cement, Class A CKD, Shale, Fly ash, and Lime

| Sample | Portland Cement Class A (% by wt) | CKD Class A (% by wt) | Vitrified Shale[1] (% by wt) | POZMIX ® A Additive (% by wt) | Hydrated Lime (% by wt) | 10-Day Compressive Strength at 140° F. (psi) |
|---|---|---|---|---|---|---|
| No. 61 | 26 | 0 | 0 | 61 | 13 | 1,153 |
| No. 62 | 19.5 | 6.5 | 0 | 61 | 13 | 1,151 |
| No. 63 | 20.7 | 5.3 | 0 | 61 | 13 | 1,093 |
| No. 64 | 23.3 | 2.7 | 0 | 61 | 13 | 950 |
| No. 65 | 19.4 | 3.3 | 3.3 | 61 | 13 | 1,161 |
| No. 66 | 20.7 | 2.65 | 2.65 | 61 | 13 | 1,009 |
| No. 67 | 23.3 | 1.35 | 1.35 | 61 | 13 | 1,231 |

[1]The vitrified shale used was "PRESSUR-SEAL ® FINE LCM" material.

EXAMPLE 16

A series of foamed sample compositions were prepared in accordance with the following procedure. For each sample, a base sample composition was prepared that comprised water, Class A Portland cement, Class A CKD, vitrified shale, "POZMIX® A" cement additive (61% by weight), and hydrated lime (13% by weight). This Sample had a density of 14.2 ppg. The vitrified shale used was "PRESSUR-SEAL® FINE LCM" material. The amounts of CKD, Portland cement, and vitrified shale were varied as shown in the table below. "ZONESEAL® 2000" foaming additive was then added to each base sample composition in an amount of 2% bvow. Next, each base sample composition was foamed down to about 12 ppg. After preparation, the resulting foamed sample compositions were subjected to 72-hour compressive strength tests at 140° F. in accordance with API Specification 10.

The results of the compressive strength tests are set forth in the table below.

TABLE 16

Foamed Compressive Strength Tests:
Class A Cement, Class A CKD, Shale, Fly Ash, and Lime

| Sample | Portland Cement Class A (% by wt) | CKD Class A (% by wt) | Vitrified Shale[1] (% by wt) | POZMIX ® A Additive (% by wt) | Hydrated Lime (% by wt) | 72-Hour Compressive Strength at 140° F. (psi) |
|---|---|---|---|---|---|---|
| No. 68 | 26 | 0 | 0 | 61 | 13 | 1,057 |
| No. 69 | 19.5 | 6.5 | 0 | 61 | 13 | 969 |
| No. 70 | 20.7 | 5.3 | 0 | 61 | 13 | 984 |
| No. 71 | 19.4 | 3.3 | 3.3 | 61 | 13 | 921 |
| No. 72 | 20.7 | 2.65 | 2.65 | 61 | 13 | 811 |
| No. 73 | 23.3 | 1.35 | 1.35 | 61 | 13 | 969 |

[1]The vitrified shale used was "PRESSUR-SEAL ® FINE LCM" material.

EXAMPLE 17

Foamed Sample Composition No. 74 was prepared in accordance with the following procedure. A base sample composition was prepared that comprised water, Class G Portland cement (19.5% by weight), Class G CKD (6.5% by weight), "POZMIX® A" cement additive (61% by weight), and hydrated lime (13% by weight). This base sample had a density of 14.2 ppg. "ZONESEAL® 2000" foaming additive was then added to each base sample composition in an amount of 2% bvow. Next, the base sample was foamed down to about 12 ppg. After preparation, the resulting Foamed Sample Composition was subjected to a 72-hour compressive strength test at 140° F. in accordance with API Specification 10.

The result of the compressive strength test is set forth in the table below.

TABLE 17

Foamed Compressive Strength Tests:
Class G Cement, Class G CKD, Fly Ash, and Lime

| Sample | Portland Cement Class G (by wt) | CKD Class G (by wt) | POZMIX ® A Additive (by wt) | Hydrated Lime (by wt) | 72-Hour Compressive Strength at 140° F. (psi) |
|---|---|---|---|---|---|
| No. 74 | 19.5 | 6.5 | 61 | 13 | 777 |

Accordingly, Examples 15-17 indicate that foamed settable compositions comprising Portland cement, CKD, fly ash, hydrated lime, and optionally vitrified shale may have suitable compressive strengths for a particular application.

EXAMPLE 18

A series of sample settable compositions were prepared at room temperature and subjected to 24-hour compressive strength tests at 180° F. in accordance with API Specification 10. The sample compositions comprised water, Class A CKD, Class A Portland cement, zeolite, vitrified shale, and hydrated lime. The vitrified shale used was "PRESSUR-SEAL® FINE LCM" material. The amount of each component was varied as shown in the table below.

The results of the compressive strength tests are set forth in the table below.

TABLE 18

Unfoamed Compressive Strength Tests:
Class A Cement, Class A CKD, Zeolite, Shale, and Lime

| Sample | Density (ppg) | Portland Cement Class A (% by wt) | CKD Class A (% by wt) | Zeolite (% by wt) | Vitrified Shale[1] (% by wt) | Hydrated Lime (% by wt) | 24-Hour Compressive Strength at 180° F. (psi) |
|---|---|---|---|---|---|---|---|
| No. 75 | 13.3 | 50 | 25 | 25 | 0 | 0 | 1,915 |
| No. 76 | 12.75 | 50 | 25 | 12.5 | 12.5 | 0 | 2,190 |
| No. 77 | 11.6 | 0 | 75 | 10 | 25 | 0 | 31.6 |
| No. 78 | 12.8 | 25 | 50 | 23.5 | 0 | 0 | 875 |
| No. 79 | 12.5 | 25 | 50 | 12.5 | 12.5 | 0 | 923 |
| No. 80 | 11.5 | 0 | 70 | 10 | 15 | 5 | 116.4 |

[1]The vitrified shale used was "PRESSUR-SEAL ® FINE LCM" material.

EXAMPLE 19

Foamed Sample Composition No. 81 was prepared in accordance with the following procedure. A base sample composition was prepared that comprised water, Class A Portland cement, Class A CKD, and zeolite. This base sample had a density of 14.2 ppg. "ZONESEAL® 2000" foaming additive was then added in an amount of 2% bvow. Next, the base sample was foamed down to about 12 ppg. After preparation, the resulting Foamed Sample Composition was subjected to a 72-hour compressive strength test at 140° F. in accordance with API Specification 10.

The result of the compressive strength test is set forth in the table below.

TABLE 19

Foamed Compressive Strength Tests:
Class A Cement, Class A CKD, and Zeolite

| Sample | Base Density (ppg) | Foam Density (ppg) | Portland Cement Class A (% by wt) | CKD Class A (% by wt) | Zeolite (% by wt) | 72-Hour Compressive Strength at 140° F. (psi) |
|---|---|---|---|---|---|---|
| No. 81 | 13.35 | 12 | 50 | 25 | 25 | 972 |

EXAMPLE 20

Sample Composition No. 82 was prepared at room temperature and subjected to a 24-hour compressive strength test at 180° F. in accordance with API Specification 10. Sample Composition No. 82 comprised water, Portland Class H Cement, Class H CKD, Zeolite, and vitrified shale. The vitrified shale used was "PRESSUR-SEAL® FINE LCM" material.

The result of the compressive strength test is set forth in the table below.

TABLE 20

Unfoamed Compressive Strength Tests:
Class H Cement, Class H CKD, Zeolite and Shale

| Sample | Density (ppg) | Portland Cement Class H (% by wt) | CKD Class H (% by wt) | Zeolite (% by wt) | Vitrified Shale[1] (% by wt) | 24-Hour Compressive Strength at 180° F. (psi) |
|---|---|---|---|---|---|---|
| No. 82 | 15.2 | 50 | 25 | 12.5 | 12.5 | 2,280 |

[1]The vitrified shale used was "PRESSUR-SEAL ® FINE LCM" material.

EXAMPLE 21

Sample Composition No. 83 was prepared at room temperature and subjected to thickening time and fluid loss tests at 140° F. in accordance with API Specification 10. Sample Composition No. 83 comprised Class A Portland Cement (50% by weight), Class A CKD (25% by weight), zeolite (12.5% by weight), vitrified shale (12.5% by weight), "HALAD® 23" fluid loss control additive (0.75% by weight), and "HR®-5" set retarder (0.5% by weight). This Sample had a density of 12.75 ppg. The vitrified shale used was "PRESSUR-SEAL® FINE LCM" material.

The results of the fluid loss and thickening time tests are set forth in the table below.

TABLE 21

Unfoamed Thickening Time and Fluid Loss Tests:
Class A Cement, Class A CKD, Zeolite and Shale

| Sample | Portland Cement Class A (% by wt) | CKD Class A (% by wt) | Zeolite (% by wt) | Vitrified Shale[1] (% by wt) | Thickening Time to 70 BC at 140° F. (min:hr) | Fluid Loss in 30 min at 140° F. (ml) |
|---|---|---|---|---|---|---|
| No. 83 | 50 | 25 | 12.5 | 12.5 | 8:54 | 196 |

[1] The vitrified shale used was "PRESSUR-SEAL ® FINE LCM" material.

Accordingly, Examples 18-21 indicate that foamed and unfoamed settable compositions comprising Portland cement, CKD, zeolite, and optionally vitrified shale may have suitable compressive strengths for a particular application.

EXAMPLE 22

A series of sample settable compositions were prepared at room temperature and subjected to 24-hour compressive strength tests at 190° F. in accordance with API Specification 10. The sample compositions comprised water, slag cement, Class H CKD, Class H Portland cement, sodium carbonate, and hydrated lime. The slag cement contained sodium carbonate in an amount of 6% by weight. The amount of each component was varied as shown in the table below.

The results of the compressive strength tests are set forth in the table below.

TABLE 22

Unfoamed Compressive Strength Tests:
Class H Cement, Class H CKD, Slag Cement, and Lime

| Sample | Density (ppg) | Portland Cement Class H (% by wt) | CKD Class H (% by wt) | Slag Cement (% by wt) | Hydrated Lime (% by wt) | 24-Hour Compressive Strength at 190° F. (psi) |
|---|---|---|---|---|---|---|
| No. 84 | 13.2 | 0 | 50 | 45 | 5 | 123.6 |
| No. 85 | 13.6 | 0 | 50 | 50 | 0 | 170.3 |
| No. 86 | 14 | 30 | 50 | 20 | 0 | 183.2 |
| No. 87 | 15 | 30 | 20 | 50 | 0 | 563 |

EXAMPLE 23

A series of foamed sample settable compositions were prepared at room temperature and subjected to 72-hour compressive strength tests at 140° F. in accordance with API Specification 10. For each sample, a base sample composition comprised water, slag cement, Class H CKD, Class H Portland cement, and hydrated lime. The amount of each component was varied as shown in the table below. The slag cement contained sodium carbonate in an amount of 6% by weight. "ZONESEAL® 2000" foaming additive was then added to each base sample composition in an amount of 2% bvow. Next, each base sample composition was foamed down to about 11 ppg. After preparation, the resulting Foamed Sample Composition was subjected to a 72-hour compressive strength test at 140° F. in accordance with API Specification 10.

The result of the compressive strength tests are set forth in the table below.

TABLE 23

Foamed Compressive Strength Tests:
Class H Cement, Class H CKD, Slag Cement, and Lime

| Sample | Base Density (ppg) | Foam Density (ppg) | Portland Cement Class H (% by wt) | CKD Class H (% by wt) | Slag Cement (% by wt) | Hydrated Lime (% by wt) | 72-Hour Compressive Strength at 140° F. (psi) |
|---|---|---|---|---|---|---|---|
| No. 88 | 13.63 | 11 | 0 | 50 | 45 | 5 | 148.9 |
| No. 89 | 13.68 | 11 | 0 | 50 | 50 | 0 | 161.1 |
| No. 90 | 14.07 | 11 | 30 | 50 | 20 | 0 | 125 |

Accordingly, Examples 22-23 indicate that foamed and unfoamed settable compositions comprising CKD, slag cement, optionally hydraulic cement, and optionally hydrated lime may have suitable compressive strengths for a particular application.

EXAMPLE 24

A series of sample settable compositions were prepared at room temperature and subjected to 24-hour compressive strength tests at 180° F. in accordance with API Specification 10. The sample compositions comprised water, Portland Cement, CKD, metakaolin, and vitrified shale. The amount of each component was varied as shown in the table below. The vitrified shale used was "PRESSUR-SEAL® FINE LCM" material. Class A Portland Cement was used for this series of tests, except that Class H Portland Cement was used in Sample No. 93. Class A CKD was used for this series of tests, except that Class H CKD was used in Sample No. 93.

The results of the compressive strength tests are set forth in the table below.

TABLE 24

Compressive Strength Tests:
Cement CKD, Metakaolin, and Shale

| Sample | Density (ppg) | Portland Cement (% by wt) | CKD (% by wt) | Metakaolin (% by wt) | Vitrified Shale[1] (% by wt) | 24-Hour Compressive Strength at 180° F. (psi) |
|---|---|---|---|---|---|---|
| No. 91 | 12.75 | 50 | 25 | 12.5 | 12.5 | 1,560 |
| No. 92 | 13.5 | 50 | 25 | 25 | 0 | 1,082 |
| No. 93 | 13 | 25 | 50 | 12.5 | 12.5 | 1,410 |

[1]The vitrified shale used was "PRESSUR-SEAL ® FINE LCM" material.

EXAMPLE 25

A series of foamed sample settable compositions were prepared at room temperature and subjected to 72-hour compressive strength tests at 180° F. in accordance with API Specification 10. For each sample, a base sample composition was prepared that comprised water, Portland Cement, CKD, metakaolin, and vitrified shale. The amount of each component was varied as shown in the table below. The vitrified shale used was "PRESSUR-SEAL® FINE LCM" material. Class A Portland Cement was used for this series of tests, except that Class H Portland Cement was used in Sample No. 96. Class A CKD was used for this series of tests, except that Class H CKD was used in Sample No. 96. "ZONESEAL® 2000" foaming additive was then added to each base sample composition in an amount of 2% bvow. Next, each base sample composition was foamed down to the density shown in the table below.

The results of the compressive strength tests are set forth in the table below.

TABLE 25

Foamed Compressive Strength Tests:
Cement, CKD, Metakaolin, and Shale

| Sample | Base Density (ppg) | Foam Density (ppg) | Portland Cement (% by wt) | CKD (% by wt) | Metakaolin (% by wt) | Vitrified Shale[1] (% by wt) | 72-Hour Compressive Strength at 180° F. (psi) |
|---|---|---|---|---|---|---|---|
| No. 94 | 12.75 | 9.85 | 50 | 25 | 12.5 | 12.5 | 651 |
| No. 95 | 13.5 | 9.84 | 50 | 25 | 25 | 0 | 512 |
| No. 96 | 13 | 9.57 | 25 | 50 | 12.5 | 12.5 | 559 |

[1]The vitrified shale used was "PRESSUR-SEAL ® FINE LCM" material.

Accordingly, Examples 24-25 indicate that foamed and unfoamed settable compositions comprising hydraulic cement, CKD, metakaolin, and optionally vitrified shale may have suitable compressive strengths for a particular application.

Therefore, the present invention is well adapted to attain the ends and advantages mentioned as well as those that are inherent therein. While numerous changes may be made by those skilled in the art, such changes are encompassed within the spirit of this invention as defined by the appended claims. The terms in the claims have their plain, ordinary meaning unless otherwise explicitly and clearly defined by the patentee.

What is claimed is:

1. A foamed settable composition comprising:
   cement kiln dust present in an amount in the range of from 70% to 100% by weight of dry components;
   water;
   a gas; and
   a surfactant.

2. The foamed settable composition of claim 1 wherein the water is selected from the group consisting of: freshwater; saltwater; a brine; seawater; and combinations thereof.

3. The foamed settable composition of claim 1 wherein the cement kiln dust is present in the foamed settable composition in an amount in the range of from about 75% to 100% by weight of dry components.

4. The foamed settable composition of claim 1 wherein the foamed settable composition further comprises a hydraulic cement.

5. The foamed settable composition of claim 4 wherein the hydraulic cement comprises at least one cement selected from the group consisting of: a Portland cement; a pozzolana cement; a gypsum cement; a high alumina content cement; a slag cement; a silica cement; and combinations thereof.

6. The foamed settable composition of claim 1 wherein the hydraulic cement is present in the foamed settable composition in an amount in the range of from 0% to 30% by weight of dry components.

7. The foamed settable composition of claim 1 wherein the foamed settable composition further comprises at least one additive selected from the group consisting of: fly ash; shale; zeolite; slag cement; metakaolin; and combinations thereof.

8. The foamed settable composition of claim 1 wherein the gas comprises at least one member selected from the group consisting of: air; nitrogen; and combinations thereof.

9. The foamed settable composition of claim 1 wherein the gas is present in the foamed settable composition in an amount in the range of from about 10% to about 80% by volume of the foamed cement composition.

10. The foamed settable composition of claim 1 wherein the surfactant comprises a foaming and stabilizing surfactant composition.

11. The foamed settable composition of claim 10 wherein the foaming and stabilizing surfactant composition comprises at least one surfactant selected from the group consisting of: a mixture of an ammonium salt of an alkyl ether sulfate, a cocoamidopropyl betaine surfactant, a cocoamidopropyl dimethylamine oxide surfactant, sodium chloride, and water; a mixture of an ammonium salt of an alkyl ether sulfate surfactant, a cocoamidopropyl hydroxysultaine surfactant, a cocoamidopropyl dimethylamine oxide surfactant, sodium chloride, and water; a hydrolyzed keratin; a mixture of an ethoxylated alcohol ether sulfate surfactant, an alkyl or alkene amidopropyl betaine surfactant, and an alkyl or alkene dimethylamine oxide surfactant; an aqueous solution of an alpha-olefinic sulfonate surfactant and a betaine surfactant; and combinations thereof.

12. The foamed settable composition of claim 1 wherein the foamed settable composition further comprises at least one additive selected from the group consisting of: a set retarding additive; an accelerator; a lost circulation material; a filtration control additive; and combinations thereof.

13. A foamed settable composition consisting of:
cement kiln dust;
water;
gas; and
surfactant.

14. The foamed settable composition of claim 13 wherein the water is selected from the group consisting of freshwater, saltwater, a brine, seawater, and combinations thereof.

15. The foamed settable composition of claim 13 wherein the gas is selected from the group consisting of air, nitrogen, and combinations thereof.

16. The foamed settable composition of claim 13 where the surfactant is selected from the group consisting of a mixture of an ammonium salt of an alkyl ether sulfate, a cocoamidopropyl betaine surfactant, a cocoamidopropyl dimethylamine oxide surfactant, sodium chloride, and water; a mixture of an ammonium salt of an alkyl ether sulfate surfactant, a cocoamidopropyl hydroxysultaine surfactant, a cocoamidopropyl dimethylamine oxide surfactant, sodium chloride, and water; a hydrolyzed keratin; a mixture of an ethoxylated alcohol ether sulfate surfactant, an alkyl or alkene amidopropyl betaine surfactant, and an alkyl or alkene dimethylamine oxide surfactant; an aqueous solution of an alpha-olefinic sulfonate surfactant and a betaine surfactant; and combinations thereof.

17. A foamed settable composition consisting of:
hydraulic cement selected from the group consisting of a Portland cement, a pozzolana cement, a gypsum cement, a high alumina cement, a slag cement, a silica cement, and combinations thereof;
cement kiln dust;
water;
gas; and
surfactant.

18. The foamed settable composition of claim 17 wherein the water is selected from the group consisting of freshwater, saltwater, a brine, seawater, and combinations thereof.

19. The foamed settable composition of claim 17 wherein the cement kiln dust is present in the foamed settable composition in an amount in the range of from about 5% to 100% of the combined weight of the cement kiln dust and the hydraulic cement.

20. The foamed settable composition of claim 17 wherein the cement kiln dust is present in the foamed settable composition in an amount in the range of from about 75% to 100% of the combined weight of the cement kiln dust and the hydraulic cement.

21. The foamed settable composition of claim 17 wherein the gas is selected from the group consisting of air, nitrogen, and combinations thereof.

22. The foamed settable composition of claim 17 where the surfactant is selected from the group consisting of a mixture of an ammonium salt of an alkyl ether sulfate, a cocoamidopropyl betaine surfactant, a cocoamidopropyl dimethylamine oxide surfactant, sodium chloride, and water; a mixture of an ammonium salt of an alkyl ether sulfate surfactant, a cocoamidopropyl hydroxysultaine surfactant, a cocoamidopropyl dimethylamine oxide surfactant, sodium chloride, and water; a hydrolyzed keratin; a mixture of an ethoxylated alcohol ether sulfate surfactant, an alkyl or alkene amidopropyl betaine surfactant, and an alkyl or alkene dimethylamine oxide surfactant; an aqueous solution of an alpha-olefinic sulfonate surfactant and a betaine surfactant; and combinations thereof.

23. A foamed settable composition consisting of:
hydraulic cement selected from the group consisting of a Portland cement, a pozzolana cement, a gypsum cement, a high alumina cement, a slag cement, a silica cement, and combinations thereof;
cement kiln dust;
water;
gas;
surfactant; and
at least one additive selected from the group consisting of a set retarding additive, an accelerator, a lost circulation material, a filtration control additive, and combinations thereof.

24. The foamed settable composition of claim 23 wherein the water is selected from the group consisting of freshwater, saltwater, a brine, seawater, and combinations thereof.

25. The foamed settable composition of claim 23 wherein the cement kiln dust is present in the foamed settable composition in an amount in the range of from about 5% to 100% by weight of dry components.

26. The foamed settable composition of claim 23 wherein the cement kiln dust is present in the foamed settable composition in an amount in the range of from about 75% to 100% by weight of dry components.

27. The foamed settable composition of claim 23 wherein the gas is selected from the group consisting of air, nitrogen, and combinations thereof.

28. The foamed settable composition of claim 23 where the surfactant is selected from the group consisting of a mixture of an ammonium salt of an alkyl ether sulfate, a cocoamidopropyl betaine surfactant, a cocoamidopropyl dimethylamine oxide surfactant, sodium chloride, and water; a mixture of an ammonium salt of an alkyl ether sulfate surfactant, a cocoamidopropyl hydroxysultaine surfactant, a cocoamidopropyl dimethylamine oxide surfactant, sodium chloride, and water; a hydrolyzed keratin; a mixture of an ethoxylated alcohol ether sulfate surfactant, an alkyl or alkene amidopropyl betaine surfactant, and an alkyl or alkene dimethylamine oxide surfactant; an aqueous solution of an alpha-olefinic sulfonate surfactant and a betaine surfactant; and combinations thereof.

* * * * *